(No Model.)
A. DWELLE.
SHAFT STRAIGHTENING MACHINE.
No. 366,466. Patented July 12, 1887.
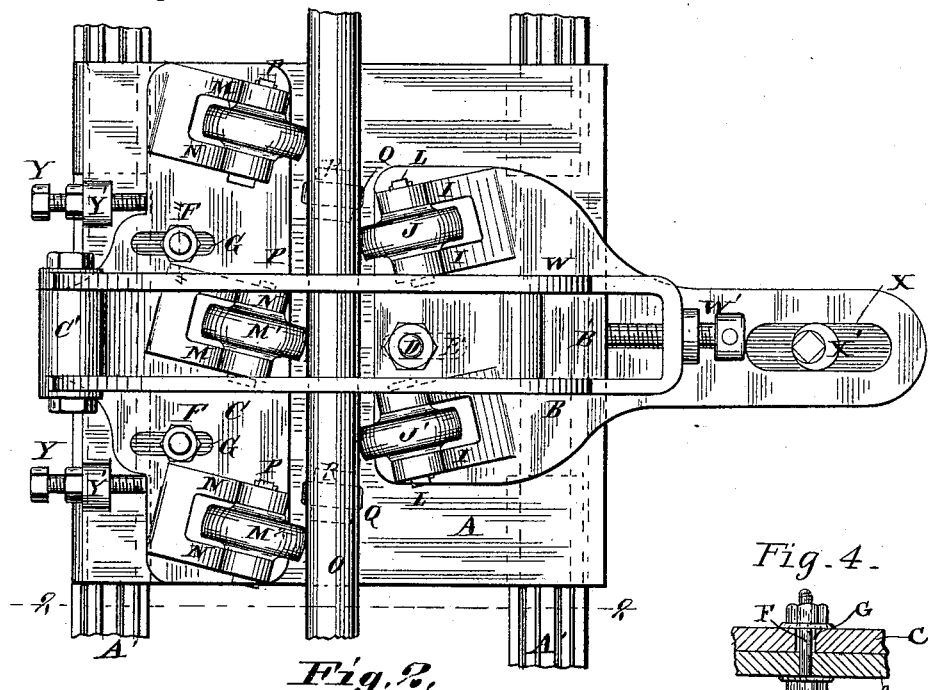
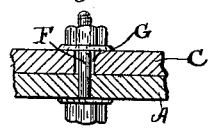
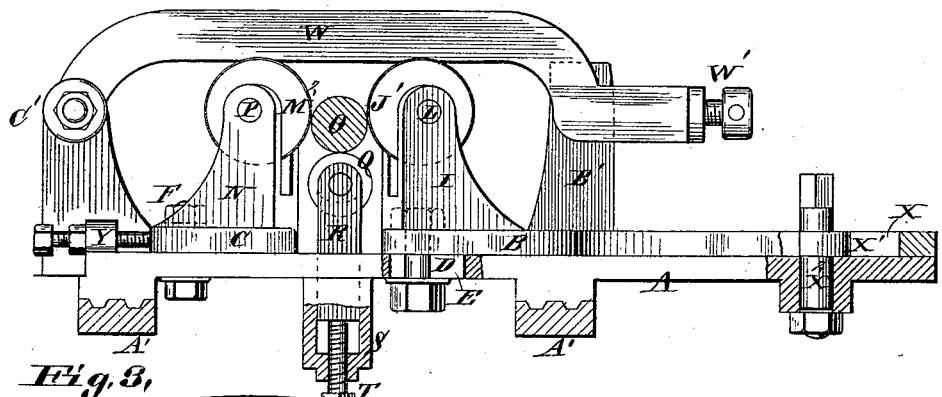
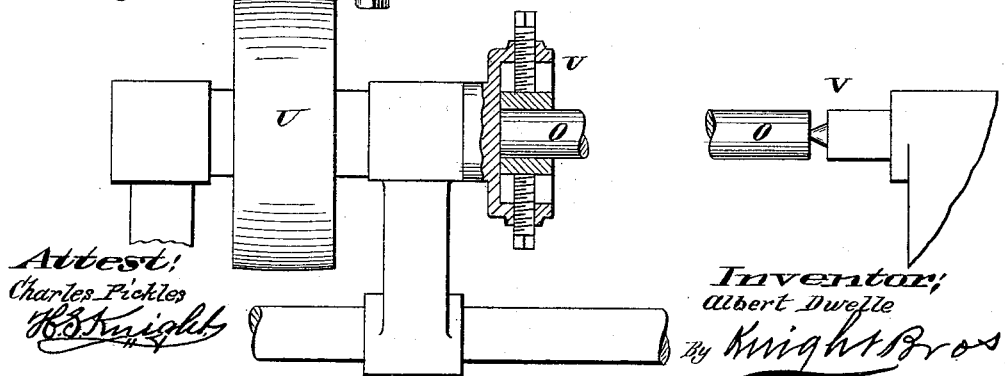
Attest:
Charles Pickles
Inventor:
Albert Dwelle
By Knight Bros
att'ys

UNITED STATES PATENT OFFICE.

ALBERT DWELLE, OF ST. LOUIS, MISSOURI.

SHAFT-STRAIGHTENING MACHINE.

SPECIFICATION forming part of Letters Patent No. 366,466, dated July 12, 1887.

Application filed November 1, 1886. Serial No. 217,702. (No model.)

*To all whom it may concern:*

Be it known that I, ALBERT DWELLE, of the city of St. Louis, in the State of Missouri, have invented a certain new and useful Improvement in Shaft-Straightening Machines, of which the following is a full, clear, and exact description, reference being had to the accompanying drawings, forming part of this specification, and in which—

Figure 1 is a top or plan view of my improved machine. Fig. 2 is a vertical section taken on line 2 2, Fig. 1. Fig. 3 is a detail view showing a means of securing a shaft in a support, in which it is held to be straightened. Fig. 4 is a detail view showing the difference in diameter between the slot and the bolt passing therethrough, connecting one of the heads or brackets to the carriage or bed-plate.

My invention relates to an improvement in machines for straightening shafting; and my invention consists in features of novelty, hereinafter fully described, and pointed out in the claims.

Referring to the drawings, A represents a bed-plate or traveling straightener-carriage, which may be run upon any suitable form of supporting rods or base. Supported on this carriage are heads or brackets B and C. The head or bracket B is preferably secured to the frame by means of a bolt, D, fitting in a slot, E, of the bed-plate, as shown in Figs. 1 and 2. This slot permits of a longitudinal horizontal adjustment of the head B to or from the head C. The head C is held upon the bed-plate A by means of bolts F, fitting in slots G, either in the head or in the carriage or bed-plate. I have shown them in the head.

In standards or projections I of the bracket or head B are journaled straightening and draft rollers J J', held in the standards by journal-pins L. In like manner straightening and draft rollers M M' M² are journaled in standards or projections N, secured to or formed upon the head C, the rollers being secured to the standards by means of journal-pins P, as shown.

The shaft O, to be straightened, is placed between the series of idly-rotating draft-rolls J J' and M M' M², as shown in Figs. 1 and 2, and is preferably placed a little below the center of these rollers, as shown in Fig. 2, where it rests upon idly-rotating supporting-rollers, which are arranged transversely with relation to the carriage and shafting. These supporting-rollers I prefer to make adjustable to suit different-sized shafting, and as a means for adjusting the rollers I have shown them supported on vertically-sliding blocks R, fitting in sockets S, formed upon or secured to the bottom of the bed-plate or carriage. The lower ends of the blocks rest upon set-screws T, passing through the bottoms of the sockets, as shown in Fig. 2. It will thus be seen that by moving the set-screws T up or down the supporting-rollers Q can be adjusted to any desired elevation. The shaft is thus held from downward movement while being straightened, and it is prevented from upward movement because of being beneath a horizontal line drawn through the center of the straightening and draft rollers.

In order to have the rolls self-feeding, so that they will travel with the carriage from one end to the other of the shaft as it is held between a chuck, U, and a center, V, (see Fig. 3,) I place the rollers at an angle to the shaft, as shown in Fig. 1, so that as the shaft is turned by power being applied to the pulley U' of the chuck U the straightening and draft rollers and carriage or bed-plate will be moved along the shaft from one end to the other, sliding upon suitable ways or supports, A'. As the rollers travel from one end of the shaft to the other, it will be readily understood that the shaft will be straightened between the rollers.

The two series of rollers are kept from moving apart by means of a straightening and draft stirrup or frame, W, in addition to the bolts D and F, which is hinged to one of the heads, preferably C at C', and which engages over a standard, B', on the head B. This yoke is be thrown back from over the straightening and draft rollers to permit the shaft to be inserted and then is thrown forward into the position shown in Figs. 1 and 2.

In case it is desired to adjust the two series of straightening-rollers toward each other after the stirrup is placed in using position, it may be done by means of a set-screw, W', passing through the front end of the stirrup and jamming against the standard B', as shown.

It is sometime desired to have the straightening and draft rolls of the two series at one side of the machine farther apart than at the other side, for the purpose of taking out of the shaft the large bends by the first-mentioned rollers (that is, those farthest apart) and the smaller bends by the other rollers. For instance, the rollers J and M may be moved from each other, and the rollers J' M' M² may be moved toward each other, so that the rollers J and M will take out the large bends and the rollers J' M' M² take out the smaller bends. To accomplish this, I make a slot, X, in the outer end of the head B and locate in this slot an eccentric cam, X', on a short vertical shaft, X². It will be seen that by turning this shaft the head may be adjusted to bring the rollers J' nearer to the rollers M' M², and move the rollers J farther from the rollers M, or vice versa. The head C may be likewise adjusted by loosening the bolts F and turning jam-bolts Y, which pass through lugs Y' on the carriage or bed-plate and bear against the head C. To allow of this movement, the bolts F are of a diameter less than that of the slots G, as plainly shown in Fig. 4. Thus any desired adjustment of the rollers can be had. The bolts Y also serve to prevent any backward movement of the head C, as shown, as the shaft is being straightened, and any backward movement of the head B is likewise prevented by the stirrup W, in addition to the bolt D. The heads may be set farther apart or closer together by loosening and tightening the bolts F, D, and Y, so that shafts of various sizes may be straightened.

The rollers can be removed to insert different shapes or be removed when worn out by simply withdrawing the journal-pins L and P.

It is sometimes desirable to have the device after it has traversed the length of the shaft in one direction return over the shaft, traversing it in the other direction. This I can do with my improved machine, as it is only necessary to turn the shaft in the opposite direction, so that the rotation of the straightening or draft rollers M M' M² and J J' will be reversed, and then it is evident that the carriage will traverse the shaft in the opposite direction. When the rotation of the shaft is reversed, the heads are, or may be, adjusted by means of the mechanism already shown and described—that is, by means of the eccentric X' for the head B and the set-screws Y for the head C, so that the rollers J' M' M² will take out the greater bends and those J M will take out the smaller bends.

It may not always be necessary to adjust both of the heads to bring the series of straightening and draft rolls nearer together at one side of the machine than the other, as the necessary adjustment can sometimes be had by simply moving one of the heads.

I claim as my invention—

1. The combination of the carriage and its supporting-rails, the horizontally-arranged supporting-rolls set obliquely with relation to the carriage, the obliquely-arranged straightening devices on each side above the supporting devices, the specified arrangements of both the supporting and straightening devices being relative to the shafting to be straightened, and mechanism for adjusting the supporting devices toward or from the straightening devices, as set forth.

2. The combination of the carriage, the two brackets thereon, each provided with rollers, screws for adjusting the position of one of the brackets and its rollers relatively to the other bracket and its rollers, and threaded lugs on the carriage, through which the screws pass, substantially as set forth.

3. The combination of two supports, each provided with a set of rolls, a yoke or stirrup pivoted to one of said supports and provided with a screw-socket, a set-screw working in said socket, and a lug on the other support, against which the set-screw bears when the yoke is adjusted and the screw set, substantially as set forth.

4. The combination of the straightening and draft rolls, supports on which they are mounted, the carriage, pivotal connection between the supports and carriage, one of said supports having a slot, and a pivoted cam upon the carriage, adapted to engage the sides of said slot and consequently turn the said support, as set forth.

5. The combination of one set of straightening and draft rolls, the carriage, whereon they are mounted obliquely to the shafting being straightened, another set of straightening and draft rolls, the supporting-brackets on which they are mounted on the carriage obliquely to the shafting and transversely to the other set of rolls, pivotal connection between the bracket and carriage, the latter having screw-threaded perforated lugs on each side of the pivotal connection of the bracket with the carriage, and set-screws adapted to work in said perforations, whereby the rolls at either end of the bracket may be brought nearer or tighter against the shafting, substantially as and for the purpose set forth.

6. The combination of the carriage, the pivoted brackets thereon provided with rollers, a yoke pivoted to one bracket, and means for securing it to the other bracket, substantially as set forth.

7. In a shaft-straightening machine, the combination of the bed-plate A, adjustable head B, straightening-rollers J J', journaled in the head B, head C, straightening-rollers M M' M², journaled in the head C, and connecting-stirrup W, provided with set-screw W', jamming against a projection on the head B, substantially as and for the purpose set forth.

8. In a shaft-straightening machine, the combination of the bed-plate A, head B, rollers J J', journaled in the head B, head C, rollers M M' M², journaled in the head C, stirrup W, connecting the heads, and set-screws Y and W', substantially as and for the purpose set forth.

9. In combination with the bed-plate A, supporting-rollers Q, heads B C, straightening-rollers J J' M M'M², stirrup W, set-screws W', connecting-bolts D, F, and Y, eccentric cam X', secured to a shaft and fitting in a slot in the head, substantially as shown and described, for the purpose set forth.

ALBERT DWELLE.

In presence of—
GEO. H. KNIGHT,
JOE. WAHLE.